UNITED STATES PATENT OFFICE.

C. A. ROSE, OF COLUMBUS, GEORGIA.

IMPROVEMENT IN MATERIALS FOR KINDLING FIRES.

Specification forming part of Letters Patent No. 57,774, dated September 4, 1866.

*To all whom it may concern:*

Be it known that I, C. A. ROSE, of Columbus, in the county of Muscogee and State of Georgia, have invented a new and Improved Fire-Kindling Material; and I do hereby declare that the following is a full, clear, and exact description thereof, which will enable others skilled in the art to make and use the same.

The nature of this invention consists in preparing and applying a new material to be used for kindling or lighting coal or other fires as a cheap and convenient substitute for the small kindling-stuff generally employed in large cities for that purpose, made of split wood and put in bundles.

The material I employ is the straw or leaves of the yellow or other resinous pine tree, closely compressed by means of any suitable press in the same manner that hay and cotton are packed in bales or bundles. The leaves of the pine, being deciduous, annually cover the ground in large quantities in the vast pineries of the Southern States, and now go entirely to waste. To utilize this neglected natural product and make it useful, and thus increase the resources and wealth of the country, is the object of my invention.

The leaves of the pine, and especially the yellow or long-leaved pine of the Southern States, are rich in resinous matter, and, possessing also considerable woody substance, are an excellent combustive material, which is easily ignited and burns freely. When compressed in the manner described it forms a durable or lasting fire-kindling, and is then admirably adapted to the purpose of kindling coal, or even as fuel for any other purpose of combustion, either in domestic economy for heating and cooking or for steam-boilers.

Having described the nature and use of my invention, what I claim as new, and desire to secure by Letters Patent, is—

As an improved article of manufacture, a fire-kindler made of compressed pine-leaves, as herein described.

C. A. ROSE.

Witnesses:
A. R. LAMAR,
T. W. GRIMES, Jr.